Sept. 28, 1926.
E. R. STOEKLE ET AL
1,601,513
APPARATUS FOR MEASURING FLUIDS
Original Filed June 21, 1917
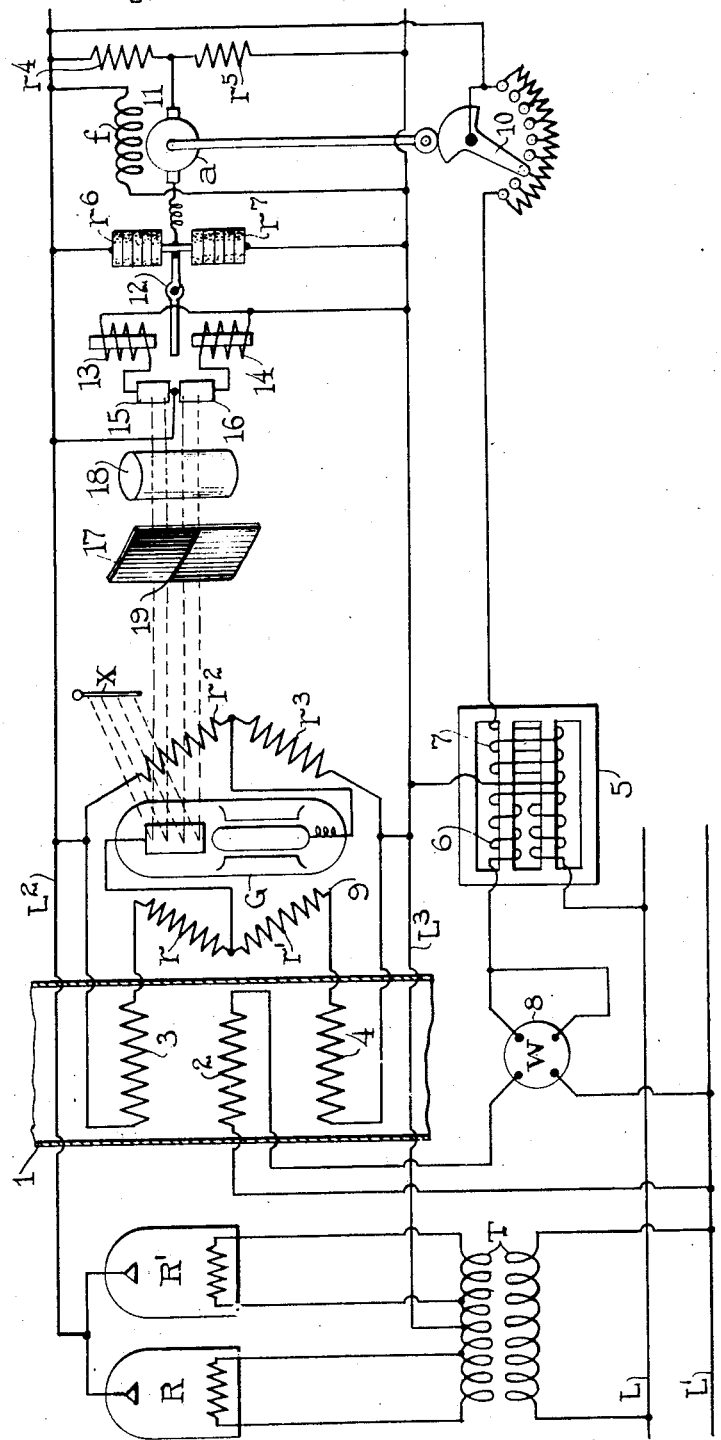
Inventors
Erwin R. Stoekle
Arthur Simon
By Frank W. Hubbard
Attorney Patented Sept. 28, 1926.

1,601,513

UNITED STATES PATENT OFFICE.

ERWIN R. STOEKLE AND ARTHUR SIMON, OF MILWAUKEE, WISCONSIN, ASSIGNORS TO THE CUTLER-HAMMER MFG. CO., OF MILWAUKEE, WISCONSIN, A CORPORATION OF WISCONSIN.

APPARATUS FOR MEASURING FLUIDS.

Application filed June 21, 1917, Serial No. 175,992. Renewed October 12, 1925.

This invention relates to apparatus for measuring the flow of fluids.

It has been proposed to measure the flow of fluids by supplying heat thereto by an electrical heater and measuring the electrical input of such heater to maintain a constant temperature difference of the flowing fluid between two given points, and the present invention has among its objects to provide more sensitive apparatus for measuring the flow of fluids by this and other methods.

A further object of the invention is to provide apparatus for the purpose specified wherein the control instrumentalities will only be required to handle very small currents, thus enabling the use of instrumentalities of reduced capacity and further enabling such reduction in size and cost of the apparatus as to adapt the same to a wider field of service.

Other objects and advantages of the invention will hereinafter appear.

One embodiment of the invention is schematically and diagrammatically illustrated in the accompanying drawing, and the same will now be described, it being understood that the invention is susceptible of various modifications falling within the scope of the appended claims.

Referring to the drawing, the same shows a pipe or conduit 1 through which the fluid to be measured is caused to flow, said pipe containing an electrical heating element 2 and resistance thermometer units 3 and 4. The heating element is interposed between the resistance thermometer units and the means hereinafter described is designed to automatically vary the electrical input of said heater to maintain a constant temperature difference between the thermometer units 3 and 4 as the flow of fluid varies, the quantity of electrical energy supplied to the heating element constituting the basis of measurement of the fluid.

The heating element is supplied with electrical energy from an alternating current source L—L' through a magnetic amplifier 5 of a well known type having an alternating current winding 6 in series with said element and a direct current winding 7 connected as hereinafter described. Also, the heating element 2 has connected in circuit therewith a wattmeter 8 whereby the energy input of said element may be determined as the basis of measurement of the flow of fluid.

The resistance thermometer units 3 and 4 are connected in a Wheatstone bridge 9, and together with the resistances $r$ and $r'$ respectively form two legs of said bridge. The other two legs of said bridge comprise resistances $r^2$ and $r^3$ and said bridge is provided with a galvanometer G of the mirror type. The Wheatstone bridge is supplied with potential from a direct current supply circuit $L^2$—$L^3$ derived from the A. C. circuit through a transformer T and rectifiers R, R' and thus the galvanometer is rendered responsive to variations in the relative resistances of thermometer units 3 and 4 resulting from variations in the temperature difference of the fluid flowing between said thermometer units. And the galvanometer is utilized to regulate the input of the electrical heating element through the means now to be described.

The energy supplied to the heating element is directly controlled by the magnetic amplifier 5, which has its winding 7 connected to the D. C. circuit $L^2$—$L^3$ and which as will be understood, greatly amplifies or reduces the energy supplied through its A. C. winding 6 upon a relatively slight variation in the current supplied to its D. C. winding. Thus the heating element may be regulated by very small current variations and for varying the current supplied to the winding 7 of the magnetic amplifier there is provided a rheostat 10 adjustable by an electric motor 11. The motor 11 is shown as of the shunt type being provided with an armature $a$ and a shunt field winding $f$, the latter being connected directly across the D. C. circuit $L^2$—$L^3$ and the former being included in a Wheatstone bridge connected to said circuit. Two legs of this bridge comprise fixed resistances $r^4$ and $r^5$, while the other two legs thereof comprise variable resistances $r^6$ and $r^7$, the latter being illustrated as of the carbon pile type. Thus the variable resistances $r^6$ and $r^7$ provide by relative adjustments thereof, for selectively rendering the motor inert, starting the same in either direction and varying the speed thereof, said resistances being so adjustable by an element 12 controlled by electromagnets 13 and 14. The electromagnets 13 and 14 are arranged to act differentially upon the member 12 and controllable through the medium of selenium cells 15 and 16 to vary the relative adjustment of said resistances. More specifically, the windings of the electromagnets 13 and 14 are connected in parallel across the D. C. circuit with the selenium cell 15 in the branch of the electromagnet 13 and the selenium cell 16 in the branch of the electromagnet 14. Thus as will be understood, the selenium cells may be influenced to render either electromagnet predominant for starting the motor 11 in a corresponding direction and moreover predominant to varying degrees for graduation of the speed of the motor. Also, as will be understood, the selenium calls may be influenced to produce such results by subjecting the same to beams of light of varying intensity and it is in such a manner that the control means described is governed by the mirrored galvanometer.

The galvanometer is subjected to a beam of light from a linear source $x$ and reflects such light through a shade screen 17 and a cylindrical lens 18 onto the selenium cells. The screen 17 is provided with an opaque band 19 which divides the beam of light reflected by the galvanometer into separate and distinct beams for the two cells. Also, the screen sections on opposite sides of the band are shaded in a reverse relation, whereby the most opaque portion of the upper section is aligned with the most transparent portion of the lower section, with the result that as the galvanometer mirror shifts its position to decrease the intensity of light reflected on one selenium cell, it will at the same time correspondingly increase the intensity of light reflected on the other cell. The arangement thus provides for influencing the selenium cells throughout a wide range and to a degree proportional to the deflection of the galvanometer.

Hence, assuming an adjustment of the apparatus such that the galvanometer equalizes the beams of light reflected upon the selenium cells when the temperature difference of the fluid is maintained at a given value, said galvanometer will, upon a change in the temperature difference be deflected in one direction or the other according to the character of temperature change and to a degree proportional to such temperature change. Thereupon the galvanometer will vary the intensities of the beams of light reflected on the selenium cells in a relation dependent upon its direction of deflection and to a degree dependent upon its degree of deflection. Thus with the electromagnetic control means illustrated the resistance of the circuit of winding 7 of the magnetic amplifier will be increased or decreased automatically according to the direction of deflection of the galvanometer and to a degree proportional to the degree of deflection which, of course, is the result desired. Moreover, after each required resistance adjustment the galvanometer will resume initial position whereby the adjustment will remain permanent pending a subsequent variation of the drop in temperature of the flowing fluid. Also, in view of the very small curent flowing in the D. C. circuit of the magnetic amplifier the rheostat 10 may be of the slide wire type to provide a continuous variation in energy instead of a step by step variation.

What we claim as new and desire to secure by Letters Patent is:

1. In apparatus for measuring the flow of fluids, in combination, electrical measuring means, energy regulating means therefor sensitive to variations in light, means sensitive to variations in flow of the fluid to be measured and adapted to subject said regulating means to corresponding variations in light for enabling measurement of the flow of fluid by said electrical measuring means.

2. In apparatus for measuring the flow of fluids, in combination, electrical measuring means, current amplifying means in circuit therewith, means sensitive to variations in light to influence said measuring means through the medium of said current amplifying means and means for subjecting said sensitive means to variations in light upon variations in flow of the fluid to be measured.

3. In apparatus for measuring the flow of fluids, in combination, electrical measuring means, energy regulating means therefor sensitive to variations in light to influence the former means and means sensitive to variations in temperature of the fluid to be measured to subject said regulating means to corresponding variations in light.

4. In apparatus for measuring the flow of fluids, in combination, electrical measuring means, current amplifying means through which said former means is supplied, regulating means for said current amplifying means, sensitive to variations in light and means sensitive to variations in the temperature of the fluid to be measured to subject said regulating means to corresponding variations in light.

5. In apparatus for measuring the flow of fluids, in combination, electrical means for heating the flowing fluid, regulating means therefor sensitive to variations in light and means sensitive to temperature variations of the flowing fluid to subject said regulating means to corresponding variations in light.

6. In apparatus for measuring the flow of fluids, in combination, an electrical heating element, current amplifying means through which said element is supplied, regulating means for said current amplifying means sensitive to variations in light and means sensitive to temperature variations of the flowing fluid to subject said regulating means to corresponding variations in light.

7. In apparatus for measuring the flow of fluids, in combination, electrical measuring means and means for subjecting the same to the influence of variations in flow of the fluid, including means sensitive to variations in light and means for graduating the light to which the former means is subjected according to the rate of flow of the fluid.

8. In apparatus for measuring the flow of fluids, in combination, electrical measuring means and means for subjecting the same to the influence of variations in flow of the fluid, including means sensitive to variations in light and thermally controlled means for graduating the light to which the former means is subjected according to the rate of flow of the fluid.

9. In apparatus for measuring the flow of fluids, in combination, electrical measuring means, energy regulating means to influence the same including control means sensitive to variations in light, and means sensitive to variations in flow of the fluid including a mirror type galvanometer to vary the intensity of the light to which said control means is subjected according to the rate of flow of fluid.

10. In apparatus for measuring the flow of fluids, in combination, electrical measuring means, and means subjecting the same to the influence of variations in the flow of fluid to be measured including a plurality of coacting devices sensitive to variations in light and means functioning upon variations in flow of the fluid to subject said devices to simultaneous and relative variations in light.

11. In apparatus for measuring the flow of fluids, in combination, electrical measuring means, and means subjecting the same to the influence of variations in the flow of fluid to be measured including a plurality of coacting devices sensitive to variations in light and means functioning upon variations in flow of the fluid to subject said devices to simultaneous and relative variations in light and to graduate the latter variations according to the degree of the former variations.

12. In apparatus for measuring the flow of fluids, in combination electrical measuring means, energy regulating means to influence the same including a plurality of control devices sensitive to variations in light and means including a mirror type galvanometer for subjecting said devices to simultaneous and relative variations in light upon variations in flow of the fluid.

13. In apparatus for measuring the flow of fluids, in combination, electrical measuring means, energy regulating means to influence the same including a plurality of control devices sensitive to variations in light and means including a mirror type galvanometer for subjecting said devices to simultaneous and relative variations in light upon variations in flow of the fluid and for graduating the former variation correspondingly to the latter variation.

14. In apparatus for measuring the flow of fluids, in combination, electrical measuring means, electro-responsive regulating means therefor having associated therewith for control thereof a plurality of selenium cells, a mirror type galvanometer to reflect light on said cells and having means associated therewith to effect inverse variations in intensity of the beams of light reflected on said cells when said galvanometer is deflected and means for causing deflection of said galvanometer upon variation in flow of the fluid from a predetermined rate.

15. In apparatus for measuring the flow of fluids, in combination, electrical measuring means, electro-responsive regulating means having associated therewith for control thereof a plurality of selenium cells, a mirror type galvanometer to reflect light on said cells and having means associated therewith to effect inverse and graduated variations in intensity of the beams of light reflected on said cells when said galvanometer is deflected and means for causing deflection of said galvanometer upon variation in flow of the fluid from a predetermined rate and to a proportional degree.

16. In apparatus for measuring the flow of fluids, in combination, measuring means, regulating means to influence the same, having control windings acting in opposition, a plurality of selenium cells each associated with one of said windings and means sensitive to variations in flow of the fluid to subject said cells to beams of light and to vary inversely the intensities of such beams of light.

17. In apparatus for measuring the flow of fluids, in combination, measuring means, regulating means to influence the same, having control windings acting in opposition, a plurality of selenium cells each associated with one of said windings and means sensitive to variations in flow of the fluid to subject said cells to beams of light and to vary inversely the intensities of such beams of light proportionally to the variations in flow of fluid.

18. In apparatus for measuring the flow of fluids, in combination, an electrical heating element to impart heat to the flowing fluid, means including a magnetic amplifier and electro-responsive regulating means therefor to vary the electrical energy supplied to said element, a plurality of selenium cells in circuit with said regulating means to govern the operation thereof, a galvanometer for reflecting light on said cells, said galvanometer having associated therewith a screened lens whereby its deflection varies inversely the intensities of the beams of light reflected on said cells and means including thermal devices subjected to the influence of the flowing fluid to cause deflection of said galvanometer upon variations in the temperature difference of the gas between given points and in a direction corresponding to the character of temperature variation.

19. In apparatus for measuring the flow of fluids, in combination, electrical measuring means including means for imparting heat to the flowing fluid, electro-responsive circuit controlling means therefor including means sensitive to variations in light for governing the operation thereof, and means sensitive to variations in temperature of the fluid to be measured due to variations in the rate of flow thereof for subjecting said light sensitive means to variations in light.

20. In apparatus for measuring the flow of fluids, in combination, an electric heating element to impart heat to the flowing fluid, means including an electric motor and electro-responsive control means therefor to vary the electrical energy supplied to said element, means sensitive to variations in light for influencing said control means, and means responsive to variations in temperature of the fluid due to variations in the rate of flow thereof to subject said light sensitive means to variations in light.

21. In apparatus for measuring the flow of fluids, in combination, means for heating the flowing fluid, regulating means therefor including an element sensitive to variations in light and means sensitive to temperature variations of the flowing fluid due to variations in the rate of flow thereof to subject said light sensitive element to proportional variations in light.

22. In apparatus for measuring the flow of fluids, in combination, electrical measuring means, including means for imparting heat to the flowing fluid, regulating means for the same comprising a pair of control windings acting in opposition, a selenium cell associated with each of said windings to control the degree of energization thereof, a combined Wheatstone bridge and galvanometer including means sensitive to variations in temperature of the fluid due to variations in the rate of flow thereof to subject said cells to beams of light and to vary the intensities of such beams of light in accordance with variations in the rate of flow of the fluid, and another Wheatstone bridge having means controlled by variations in the differential of energization of said windings to effect regulation of the energy supplied to said heating means.

In witness whereof, we have each hereunto subscribed our names.

ERWIN R. STOEKLE.
ARTHUR SIMON.